United States Patent [19]

Hung

[11] Patent Number: 4,947,939

[45] Date of Patent: Aug. 14, 1990

[54] STRUCTURE OF MOTORIZED SCREW BOLT DRIVING TOOL

[76] Inventor: Wonder Hung, No. 51, Lane 2, Chang Lu Road, Sec. 5, Lu Kang Clen, Changhua Hsien, Taiwan

[21] Appl. No.: 438,262

[22] Filed: Nov. 20, 1989

[51] Int. Cl.⁵ .................. B23Q 5/00; B60K 41/20
[52] U.S. Cl. .................................. 173/12; 173/93; 192/11
[58] Field of Search ............... 173/12, 1, 47, 93, 93.5; 192/1.1, 1.29, 1.31

[56] References Cited

U.S. PATENT DOCUMENTS

| | | | |
|---|---|---|---|
| 3,354,754 | 11/1967 | Amtsberg et al. | 173/12 X |
| 4,842,078 | 6/1989 | Hansson | 173/12 |
| 4,880,064 | 11/1989 | Willoughby et al. | 173/12 |

Primary Examiner—Frank T. Yost
Assistant Examiner—Willmon Fridie, Jr.
Attorney, Agent, or Firm—Bacon & Thomas

[57] ABSTRACT

A motorized screw bolt driving tool includes a centrifugal element to drive a brake socket to disengage from a swivel element permitting a brake element to swing in a notch on the swivel element so that a spindle can be driven by a motor to rotate clockwise or counter-clockwise for turning a screw bolt or nut.

1 Claim, 4 Drawing Sheets

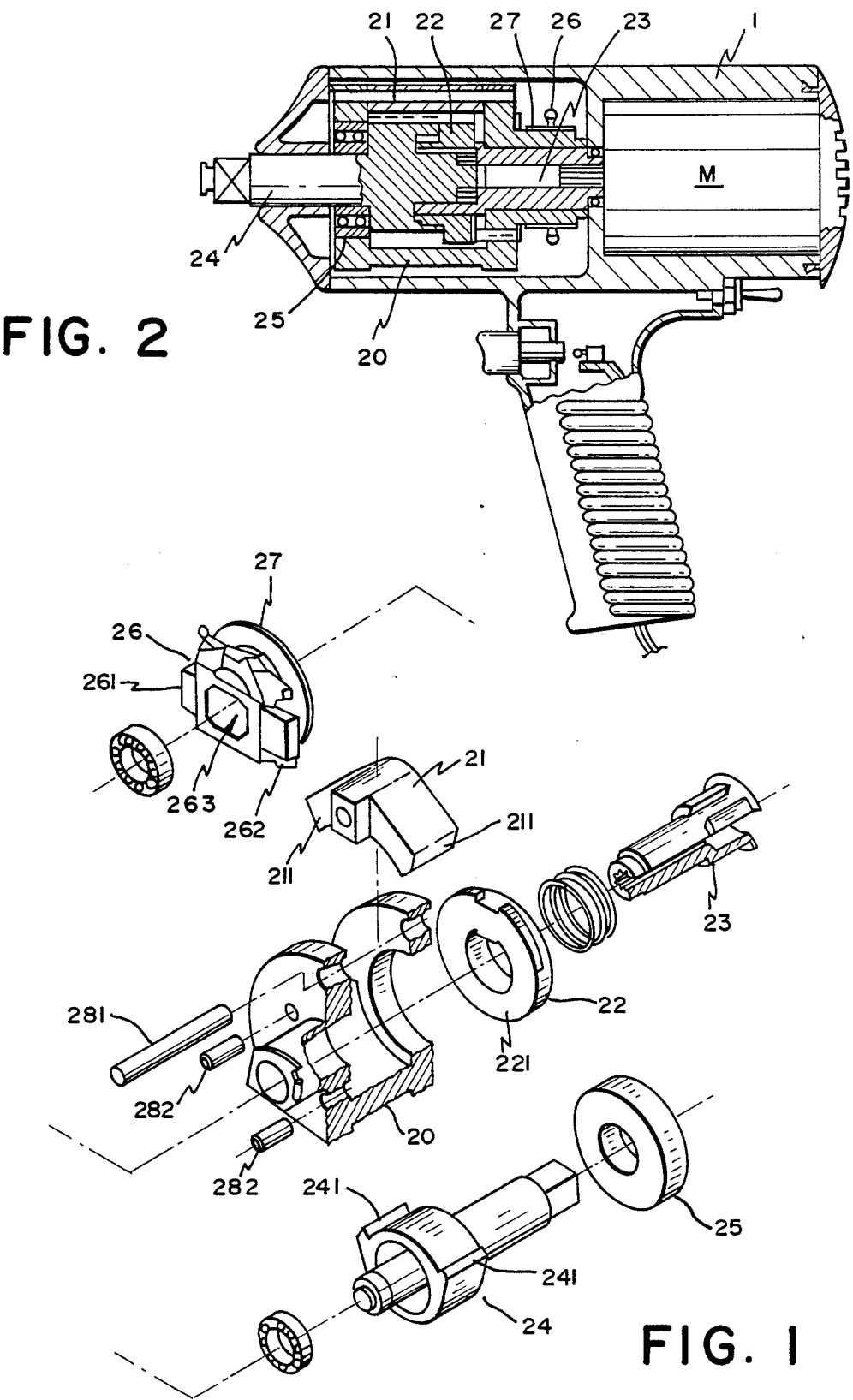

STRUCTURE OF MOTORIZED SCREW BOLT DRIVING TOOL

BACKGROUND OF THE INVENTION

1. Field of the Invention

The present invention is related to a motorized hand tool for turning screw bolts and nuts. According to the present invention, a motorized screw bolt driving tool for turning screw bolts and nuts generally includes a housing having received therein a motor, a centrifugal element comprising a pair of fins with a spring connected therebetween; a spindle comprising an axle having an arch-shaped projection at its rear end defining therewith two retaining edges; a brake socket having a pair of unitary pins respectively inserted into a swivel element; a swivel element having a notch for positioning therein of a brake element and two pin holes for insertion therein of the two pins of the brake socket; a spindle holder received in the swivel element to hold the spindle. When the motor is turned on, the centrifugal element drives the brake socket to disengage from the swivel element permitting the brake element to swing in the notch of the swivel element so that the spindle can be driven to rotate clockwise of counterclockwise for further operation in turning a screw bolt or nut.

2. Description of the Prior Art

In turning screw bolts or nuts a hand-operated or pneumatic power operated tool may required to facilitate the operation. There is a variety of hand-operated tools for turning screw bolts and nuts according to specific requirement, such as spanner, monkey wrench, screw wrench etc. Regular pneumatic power operated tools for turning screw bolts and nuts generally utilize pneumatic power to drive a spindle to rotate so as to further carry a socket to turn a screw bolt or nut. In comparison with pneumatic power operated tools, hand-operated tools are more easy to operate and convenient to carry. However, in some conditions, hand-operated tools may be useless. For instance, if a bolt is rusted or tightly screwed up with a thing, it is difficult to screw loose such a bolt with a regular hand-operated tool, and a pneumatic power operated tool may be required under this case. However, conventional pneumatic power operated tools are very expensive, heavy, not convenient for carriage, and they may make much noise during during operation. Because of the said problems, pneumatic power operated tools can not be widely accepted by consumers for regular use. In recently, a kind of directly motorized and light-weighted screw bolt driving tool has been specially designed for use to turn screw bolts and nuts and to solve the said problems. This kind of motorized screw bolt driving tool is as illustrated in FIGS. 1 and 2, which includes a housing 1 having received therein a barrel 20, a detent element 21, a power transmission control element 22, a brake element 23, a driving element 24, a cap 25, a centrifugal element 26, flange 27, and lock pins 281 and 282. The centrifugal element 27 comprises two U-shaped fins 261 and 262 at both lateral sides. During rotation of the centrifugal element 26, the two U-shaped fins 261 and 261 push the flange 27 toward the barrel 20 to further force the front face 221 of the power transmission control element 22 to contact the detent element 21 so that the driving element 24 can be carried to rotate by a motor for further screw bolt driving operation. This type of motorized screw bolt driving tool is expensive to manufacture and inconvenient to assemble. During operation, the engagement of the detent element and the driving element 24 can not be accurately attained.

SUMMARY OF THE INVENTION

The main object of the present invention is to provide a motorized screw bolt driving tool which is easy to assemble.

Another object of the present invention is to provide a motorized screw bolt driving tool which is practical and convenient in use.

Still another object of the present invention is to provide such a motorized screw bolt driving tool in which a flange, a bearing and a socket are respectively mounted on the spindle thereof to facilitate its revolving operation.

A yet further object of the present invention is to provide such a motorized screw bolt driving tool in which a rolling ball is mounted on the spindle thereof so that the spindle can be displaced in a swivel element permitting the positioning of a brake element obliquely relative to the spindle.

BRIEF DESCRIPTION OF THE DRAWINGS

FIG. 1 is a perspective fragmentary view of an internal structure of a motorized screw bolt driving tool according to the prior art;

FIG. 2 is a sectional assembly view of a motorized screw bolt driving tool according to the prior art;

DETAILED DESCRIPTION OF THE PREFERRED EMBODIMENTS

Figure 3:
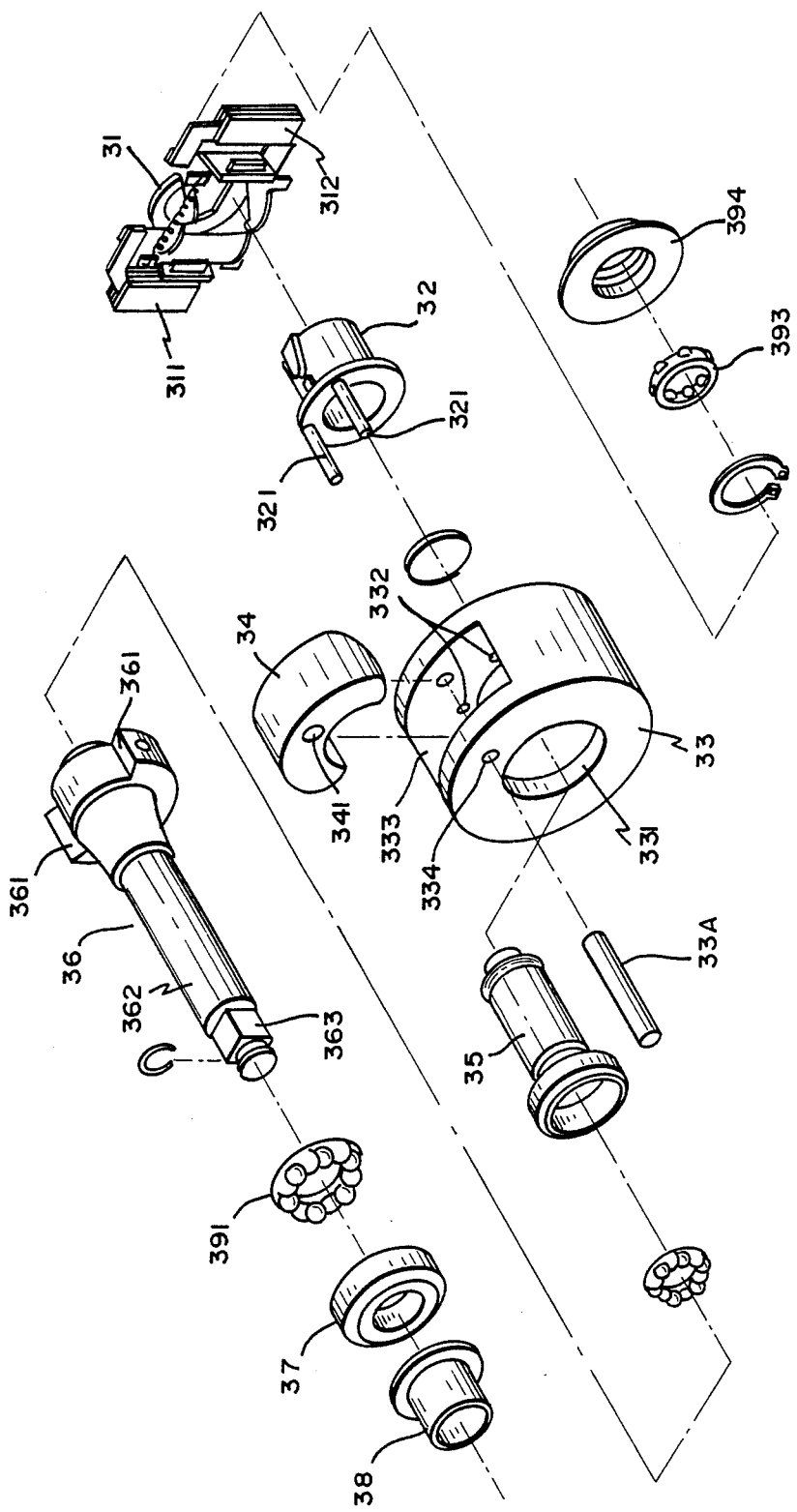
FIG. 3 is a perspective fragmentary view of an internal structure of a motorized screw bolt driving tool according to the present invention.
Figure 4:
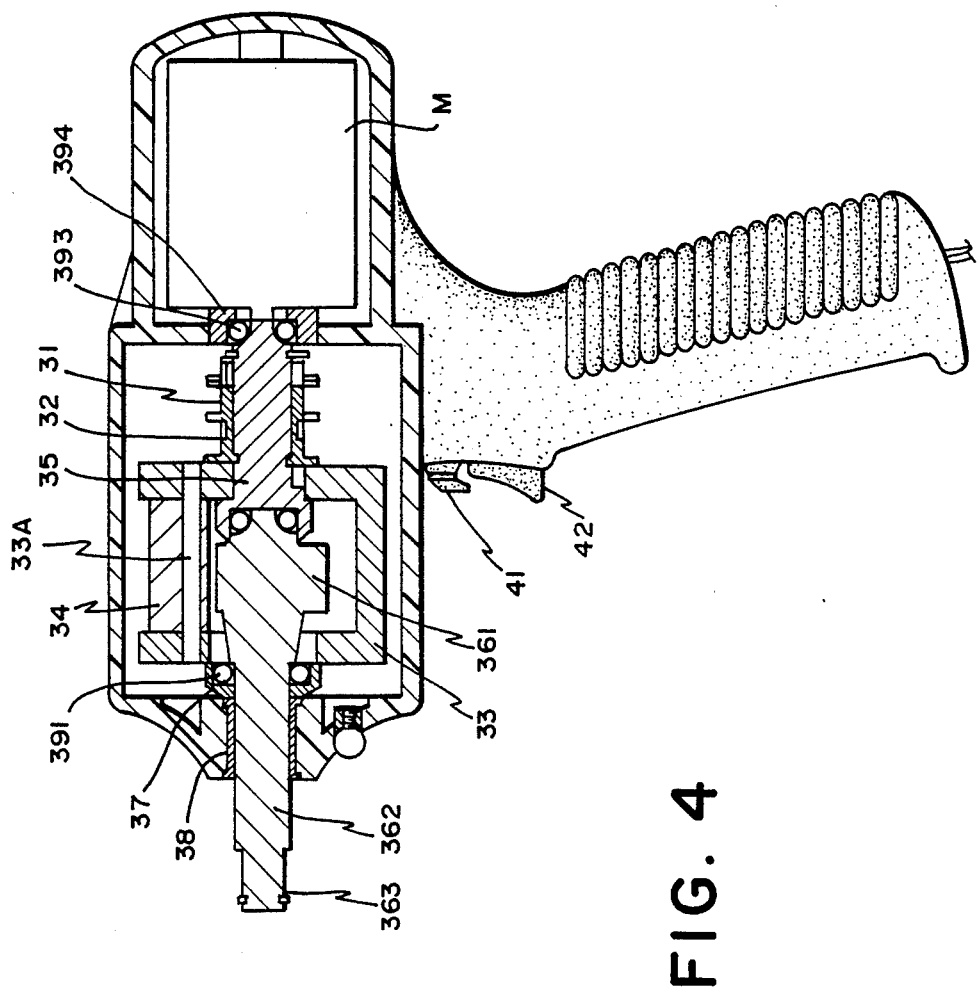
FIG. 4 is a sectional assembly view of a motorized screw bolt driving tool according to the present invention.
Figure 5:
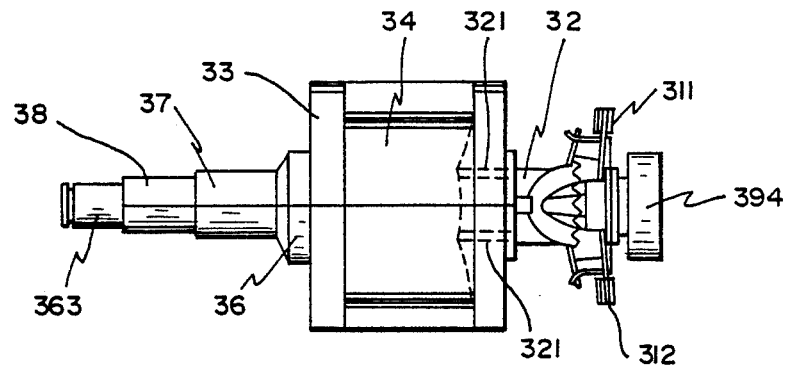
FIG. 5 is a perspective assembly view of an internal structure of a motorized screw bolt driving tool according to the present invention.

Turning now to the annexed drawings in greater detail and first referring to FIG. 3, therein illustrated is an internal structure of a motorized screw bolt driving tool constructed according to the present invention and generally comprised of a centrifugal element 31 having fins 311 and 312 at both lateral sides connected by a spring therebetween; an arch shaped brake element 34 having thereon an axial pin hole 341 for positioning; a spindle 36 including an axle 362 having a square bolt 363 extending therefrom in the front and an arch-shaped projection peripherally disposed at its rear end defining therewith two retaining edges 361 with a rolling ball 3611 mounted on such an arch-shaped projection; a brake socket 32 having a pair of unitary pins 321 extending therefrom along axial direction for insertion into two pin holes 332 on a swivel element 32; a swivel element 33 having two pin holes 332 for insertion therein of the two pins 32 of the brake socket 32, a boring bore 331 through its central axis, a notch 333 on its top surface for setting therein of said brake element 34, a through-hole 334 through the notch 333 and in parallel with the boring bore 331, and a key way 335 at a lower position; a lock pin 33A inserted from said through-hole 334 of said swivel element 33 into said pin hole 341 of said brake element 34 to secure said brake element 34 to said swivel element 33; a spindle holder 35 received in the swivel element 33 to hold the spindle 36 therein and having thereon a raised key 351 at its lower end for positioning in the key way 335 of the swivel element 33; a bearing 391, a flange 37 and a socket 38 respectively mounted on the axle 362 of the spindle 36 in order; another bearing 393 received in another flange 394 disposed at the back of the centrifugal device 31 and mounted on the rear end of the spindle holder 35 after the spindle holder 35 is inserted through the swivel element 33 and the brake socket 32. When the above said component parts are well assembled, the assembly thus obtained is as illustrated in FIG. 5.

Figure 6A:
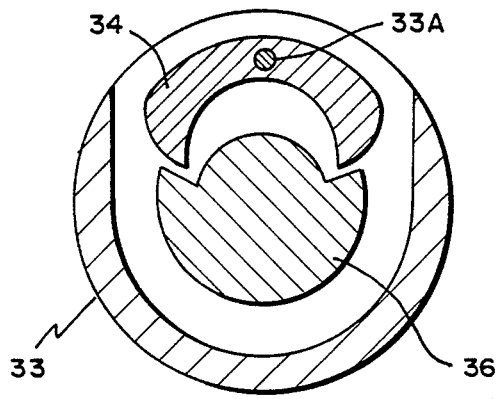
FIG. 6A is a schematic drawing, illustrating a condition of the present invention when it is not in operation.
Figure 6B:
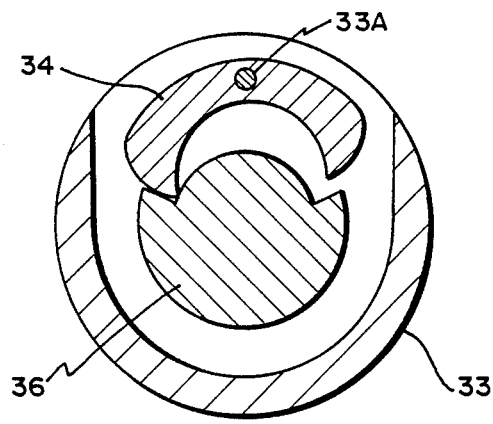
FIG. 6B is a schematic drawing, illustrating that the brake element is obliquely disposed to connect to a projecting edge of the the spindle.

Please refer to FIG. 2, which illustrates a motorized screw bolt driving tool constructed according to the present invention. Through control of a revolving direction control switch 41 and a power switch 42, a motor M is driven to carry the centrifugal element 31 to drive its fins 311 and 312 to make centrifugal movement. During centrifugal movement, the brake socket 32 is driven to become firmly seated in the centrifugal element 31 with its positioning pins 321 separated from the pin holes 332 of the swivel element 33, permitting the brake element 34 to rotate on the lock pin 33A and to further engage with either one of the projecting edges 361 of the spindle 36 (as shown in FIGS. 6A and 6B). The rolling ball 361 of the spindle 36 keeps the spindle 36 slightly away from the inner wall surface of the swivel element 33 so that the brake element 34 can dispose obliquely. Thus, rotative power is transmitted to the square bolt 363 of the spindle 36 for turning a screw bolt or nut.

I claim:

1. A motorized screw bolt driving tool, including:
   a centrifugal element mounted on a rear bearing in a rear flange and having fins at both lateral sides connected by a spring therebetween;
   a spindle comprising an axle having an arch-shaped projection peripherally disposed at its rear end defining therewith two retaining edges with a rolling ball mounted on such an arch-shaped projection;
   a brake socket having a pair of unitary pins extending therefrom along axial direction;
   a swivel element having two pin holes for insertion therein of the two pins of said brake socket, a boring bore through its central axis, a notch on its top surface, a through-hole through said notch and in parallel with said boring bore;
   a brake element having a pin hole thereon for insertion therethrough of a lock pin to secure to said swivel element in said notch;
   a spindle holder received in said swivel element to hold said spindle therein;
   a front bearing, a front flange and a socket respectively mounted on the axle of said spindle to smoothen the rotation of said axle;
   wherein revolving of said centrifugal element drives said brake socket to disengage from said swivel element permitting said brake element to swing in said notch of said swivel element so that said spindle can be driven to rotate clockwise or counterclockwise for further operation in turning a screw bolt or nut.

* * * * *